US008761126B2

(12) United States Patent
Rath et al.

(10) Patent No.: US 8,761,126 B2
(45) Date of Patent: Jun. 24, 2014

(54) METHODS AND SYSTEMS FOR UPLINK NETWORK ENTRY AND BANDWIDTH REQUESTS

(75) Inventors: Kamlesh Rath, San Ramon, CA (US); Rishi Ranjan, Foster City, CA (US); Manish Airy, Bangalore (IN); Sindhu Verma, Bangalore (IN); Soumen Chakraborty, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 213 days.

(21) Appl. No.: 13/053,642

(22) Filed: Mar. 22, 2011

(65) Prior Publication Data

US 2011/0228747 A1    Sep. 22, 2011

Related U.S. Application Data

(60) Provisional application No. 61/316,237, filed on Mar. 22, 2010.

(51) Int. Cl.
*H04B 7/216* (2006.01)
(52) U.S. Cl.
USPC ........................................................ 370/335
(58) Field of Classification Search
CPC ... H04L 1/0072; H04L 1/1812; H04L 1/1867; H04W 48/12
USPC .......... 370/203, 315, 335; 455/403, 422, 445, 455/450
See application file for complete search history.

(56) References Cited

U.S. PATENT DOCUMENTS 8,320,336 B2 * 11/2012 Youn et al. ............... 370/335
2007/0060146 A1 * 3/2007 Won et al. ............... 455/445

FOREIGN PATENT DOCUMENTS

WO    WO 2011/119571 A1    9/2011

OTHER PUBLICATIONS

Written Opinion directed toward International Application No. PCT/US2011/029375, United States Patent and Trademark Office, United States, mailed on May 20, 2011.
IEEE: "802.16-2009 Standard for Local and metropolitan area networks Part 16: Air Interface for Broadband Wireless Access Systems". May 29, 2009. Retrieved May 2, 2011 from [http://standards.ieee.org/getieee802/download/802.16-2009.pdf] p. 55, 59, 201, 876, 1173.
Wang: "Proposed Changes related to the UL HARQ Procedure for Anonymous UL Allocations (16.2.14.2.1.2)". Dec. 31, 2009. Retrieved May 2, 2011 from [http://ieee802.org/16/tgm/contrib/C80216m-09_3087.pdf] p. 3.
International Search Report for International Application No. PCT/US2011/29375, United States Patent and Trademark Office, United States, mailed on May 20, 2011.

* cited by examiner

*Primary Examiner* — Jae Y Lee
*Assistant Examiner* — Jean F Voltaire
(74) *Attorney, Agent, or Firm* — Sterne, Kessler, Goldstein & Fox P.L.L.C.

(57)    ABSTRACT

Methods and systems of a mobile station transmitting information to a base station are disclosed. The mobile station may transmit information with improved uplink coverage, and bandwidth requests may be more efficient. Additionally, the mobile station may transmit information over multiple uplink frames using hybrid ARQ.

18 Claims, 3 Drawing Sheets

METHODS AND SYSTEMS FOR UPLINK NETWORK ENTRY AND BANDWIDTH REQUESTS

RELATED APPLICATIONS

This patent application claims priority to U.S. provisional patent application Ser. No. 61/316,237 filed on Mar. 22, 2010, which is incorporated by reference.

FIELD OF THE DESCRIBED EMBODIMENTS

The described embodiments relate generally to wireless communication. More particularly, the described embodiments relate to Hybrid Automatic Repeat Request (HARQ) methods and systems for uplink random access process and bandwidth request.

BACKGROUND

Wireless communication systems are widely deployed to provide various types of communication content such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3 GPP Long Term Evolution (LTE) systems, Worldwide Interoperability for Microwave Access (WiMAX) in IEEE 802.16e, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The downlink (DL) refers to the communication link from a base station to the terminals or the mobile stations and the uplink (UL) refers to the communication link from the terminals or the mobile stations to the base stations. Grants to a mobile station (MS) for UL transmission may be provided in UL MAP information elements (IEs). The communication link may be established via a single-in-single-out, multiple-in-single-out or a multiple-in-multiple-out (MIMO) system.

Standards that are used for mobile wireless communications (e.g. WiMAX or LTE) may be limited by UL coverage, and the bandwidth request process may be inefficient. For example, WiMAX may use a 5-step Bandwidth Request process that caused increased latency for many time-sensitive UL messages. The increased latency may degrade mobile network performance and cause throughput problems with TCP traffic.

SUMMARY

UL coverage may be improved if a mobile station, attempting to enter a network, is allowed to use HARQ for the transmission of UL MAC Management messages for Network Entry. Enabling HARQ on the Ranging Request (RNG-REQ) and MS Basic Capability Request (SBC-REQ) messages may provide 4-6 dB of UL link budget improvement.

UL coverage may be improved if a mobile station is allowed to transmit an HARQ burst extending across frame boundaries, thereby occupying fewer sub-channels in each frame, instead of spanning multiple sub-channels in one frame. This multi-frame HARQ transmission is applicable to both Network Entry and UL data transmission. This can further improve link budget by enabling HARQ bursts to be scheduled over 1-4 UL frames. For example, if the UL transmission is extended to 4 frames, the UL link budget may be improved by 6 dB.

UL coverage may be improved if a mobile station, attempting to request bandwidth from a serving BS using CDMA BR codes, is allowed to use HARQ for transmission of the Bandwidth Request Header in the allocation granted to it in response to its CDMA BR code. This may eliminate a major bottle-neck in an 802.16e system where all UL traffic can get stalled due to the lack of HARQ protection on Bandwidth Requests.

WiMAX may use 5 steps to get UL grants for UL transmission: step 1) a CDMA bandwidth request (BR) code is sent by the SS; step 2) the BS sends a CDMA Allocation IE; step 3) the MS sends a bandwidth request header (BRH) in response to the CDMA Allocation IE; step 4) the BS sends an UL allocation to SS; and step 5) the MS uses the UL allocation to send an UL message/data packet.

CDMA Bandwidth Requests may be more efficient if a mobile station requesting UL bandwidth transmits a CDMA BR code, and a BS makes a large enough allocation in the CDMA Allocation IE to allow the MS to transmit UL data, instead of just a bandwidth request header (BRH). Thus, the CDMA Bandwidth Request process may be reduced to 3 steps.

Other aspects and advantages of the described embodiments will become apparent from the following detailed description, taken in conjunction with the accompanying drawings, illustrating by way of example the principles of the described embodiments.

DETAILED DESCRIPTION

Figure 1:
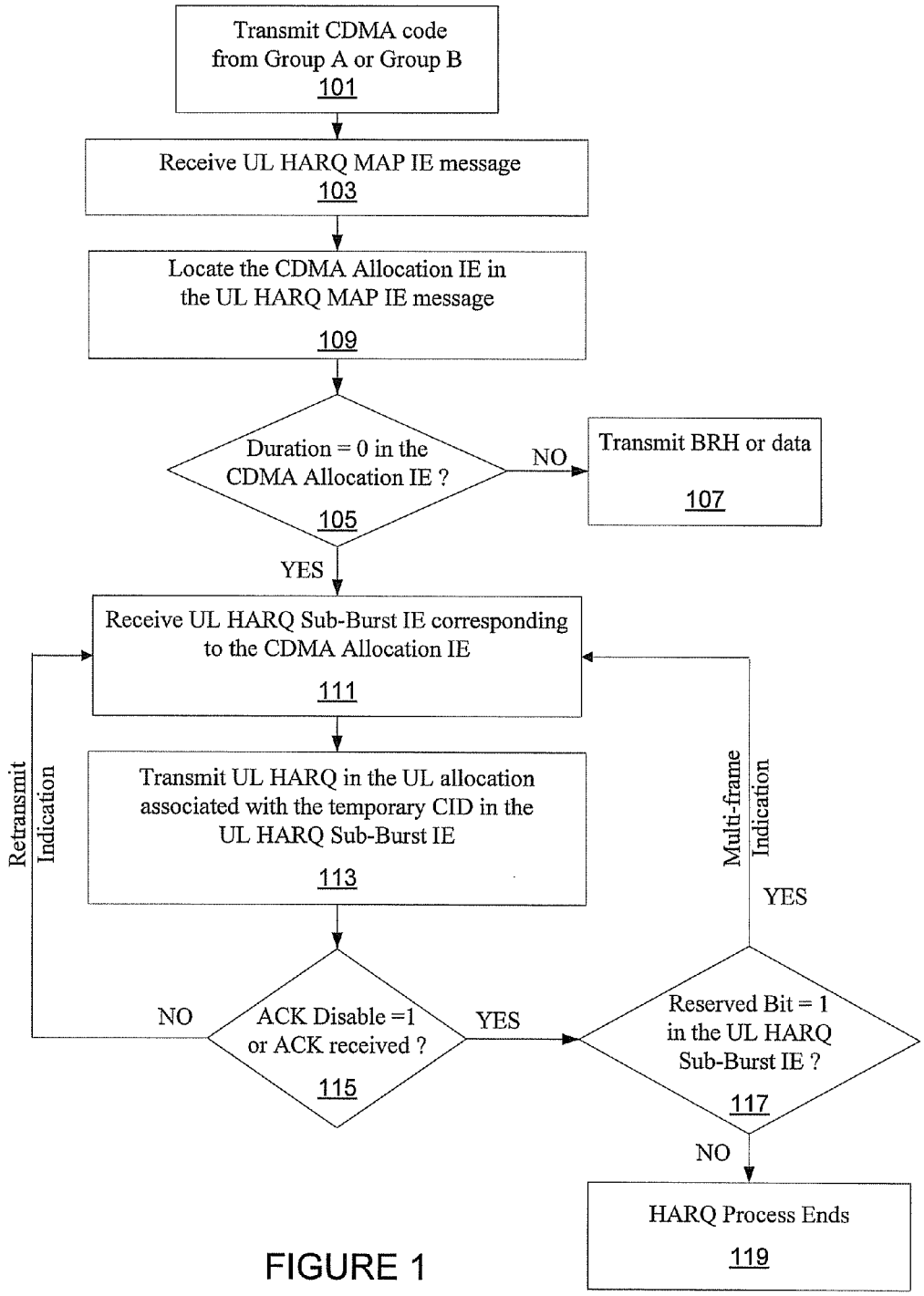
FIG. 1 is a flow chart that includes steps of an example of a method of a mobile station in accordance with the present invention.

Standards that are used for mobile wireless communications (e.g. WiMAX) may be limited by UL coverage. UL coverage limitations may be improved by addressing: 1) network entry failure due to large UL Media Access Control (MAC) management messages that are not HARQ protected; 2) large UL transmissions (e.g. UL data transmission) that may span multiple sub-channels in an UL frame causing a reduction in transmitted power per sub-carrier and a reduction in LTL carrier to interference+noise ratio (CINR); and 3) Bandwidth Requests (BRH) sent by a MS in response to a CDMA-Allocation IE that is not protected by HARQ.

Embodiments of systems and methods and apparatuses for uplink Network Entry and Bandwidth Requests are disclosed. The code-space of Initial Ranging (IR) and Bandwidth Request (BR) codes may be divided into three groups. The first group of IR/BR CDMA codes (the Default Group) may be used by a mobile station when it cannot or does not want to derive any benefit from a change in the protocol. The second and third group of IR/BR codes may be used by a mobile station when it can derive benefit from a change in the protocol. The second group of IR/BR codes (Group A) may be used to indicate a network entry request. The third group of IR/BR codes (Group B) may be used to indicate a bandwidth request. Allocation requests associated with Group A may be smaller than allocation requests associated with Group B.

IR/BR codes from Group A or Group B may implicitly signal to a base station that the CDMA code was transmitted by a mobile station. When the mobile station uses IR/BR codes from Group A or Group B, the base station responds with a CDMA Allocation IE (CDMA_Alloc_IE) and a UL HARQ Chase Sub-burst IE. The CDMA_Alloc_IE, may uniquely identify the CDMA code attributes. The UL HARQ Chase Sub-burst IE may indicate the geometry of the HARQ burst (including UL grant size) and assign a unique temporary CID to the mobile station.

A CDMA ranging code-space may be indicated in the UL channel descriptor message (UCD) as: the start of ranging codes group (S); the number of initial-ranging codes (N); and the number of bandwidth-request codes (L). Alternatively, the UCD may be used to broadcast the grouping of the IR/BR codes and thresholds. Additional Type Length Values (TLVs) in the UCD message may include:

Threshold_Group_A as the maximum size that will be allocated in CDMA_Alloc_IE following successful detection of Group A CDMA code (i.e. 0≤allocated size≤Threshold_Group_A);

Multi_Frame_Burst_Group_A as the number of consecutive frames that will be allocated if the HARQ burst is a multi-frame burst;

S_Group_A as the start of ranging codes group;

N_Group_A as the number of initial-ranging codes;

L_Group_A as the number of bandwidth-request codes;

Threshold_Group_B as the maximum size that will be allocated in CDMA_Alloc_IE following successful detection of Group B CDMA code (i.e. Threshold_Group_A≤allocated size≤Threshold_Group_B);

Multi_Frame_Burst_Group_B as the number of consecutive frames that will be allocated if the HARQ burst is a multi-frame burst;

S_Group_B as the start of ranging codes group;

N_Group_B as the number of initial-ranging codes; and

L_Group_B as the number of bandwidth-request codes.

In an allocated HARQ burst, the mobile station may transmit a UL MAC Management Message (if Group A codes are used) or UL Data (if Group B codes are used). ACK/NACKs for this UL transmission may be explicitly signaled using the DL MAP HARQ ACK IE. Subsequent retransmissions (if any) may be explicitly addressed by the base station to a temporary CID. HARQ bursts which span multiple UL frames (and have a CRC16 only at the end of the multi-frame burst) may be specified in the UL HARQ Chase Sub-burst IE.

When a mobile station (MS) uses IR/BR CDMA codes from the Default Group, base station and mobile station processing remains unchanged compared to a legacy system. If a MS is a legacy SS, it uses the Default code-space to transmit the CDMA code. If a MS supports the additional TLVs but does not want to use HARQ, it uses the Default code-space and does not attempt to use the code-space for Groups A or B. A MS may not want to use HARQ, for example, if the new TLVs are not decoded in the UCD, the MS can assume that the BS does not support the enhancements.

After transmitting the CDMA code, the MS waits for a CDMA_Alloc_IE. If a Default code-space CDMA code was transmitted and a CDMA_Alloc_IE with the same CDMA code index and frame-number is received, the MS sends a bandwidth request header (BRH) or data if possible. If a Group A or Group B CDMA code was transmitted and a CDMA_Alloc_IE: with the same CDMA code index and frame-number is received and the CDMA_Alloc_IE Duration is greater than 0, the MS sends a bandwidth request header (BRH) or data if possible. If no CDMA_Alloc_IE is received within a timeout, CDMA code transmission is restarted.

If a MS that supports the additional TLVs detects that a BS also supports the additional TLVs, the MS may use either of the Group A or Group B code-space. The selection of either Group A or Group B may depend on whether the MS will transmit a message that is smaller than Threshold_Group_A or smaller than Threshold_Group_B.

FIG. 1 is a flow chart that includes steps of an example of a method of a mobile station in accordance with the present invention. Group A or Group B CDMA code is transmitted at 101. At 103, a UL HARQ MAP IE, message is received. Table 1 shows a format of the HARQ UL MAP IE message. If the UL MAP IE, is decoded in the same UL MAP it may be parsed. Table 1 shows a format of the HARQ UL MAP IE message. At 109, a CDMA_Alloc_IE; is located in the UL HARQ MAP IE, message. If CDMA_Alloc_IE with the MS's CDMA code index and frame-number is received within a timeout period, the Duration field of the CDMA_Alloc_IE is checked at 105. If the Duration is greater than zero, the MS will transmit (at 107) the bandwidth request header or data according to a legacy protocol. If the Duration is equal to zero, the MS may wait to decode a UL HARQ MAP IN with a corresponding UL HARQ Sub-Burst IE in the same UL MAP.

TABLE 1

| Syntax | Size | Notes |
| --- | --- | --- |
| HARQ UL MAP IE( ) { | — | — |
| Extended-2 UIUC Set to 0x1 | 4 bits | HARQ_UL-MAP_IE( ) = 0x07 |
| Length | 8 bits | Length of the IE in bytes |
| RCID_Type | 2 bits | 0b00 = Normal CID |
| | | 0b01 = RCID11 |
| | | 0b10 = RCID7 |
| | | 0b11 = RCID3 |
| Reserved | 2 bits | |
| while (data remains) { | — | — |
| Mode | 3 bit | Indicates the mode of this IE |
| | | 0b000 = Chase HARQ |
| | | 0b001 = Incremental Redundancy HARQ for CTC |
| | | 0b010 = Incremental Redundancy HARQ for convolutional code |
| | | 0b011 = MIMO Chase HARQ |

TABLE 1-continued

| Syntax | Size | Notes |
|---|---|---|
| | | 0b100 = MIMO IR HARQ |
| | | 0b101 = MIMO IR HARQ for convolutional code |
| | | 0b110 = MIMO STC HARQ |
| | | 0b111 = Reserved |
| Allocation Start Indication | 1 bit | 0: No allocation start information |
| | | 1: Allocation start information follows |
| If (Allocation Start Indication == 1) { | — | — |
| OFDMA Symbol offset | 8 bits | This value indicates start Symbol offset of subsequent sub-bursts in this H-ARQ UL MAP IE |
| Subchannel offset | 7 bits | This value indicates start Subchannel offset of subsequent sub-bursts in this H-ARQ UL MAP IE |
| Reserved | 1 bit | Shall be set to zero |
| } | | |
| N sub Burst | 4 bits | Indicates the number of bursts in this UL MAP IE |
| For (i =0 ;i < N Sub-burst; i++){ | | |
|   if (Mode == 000) { | | |
|     UL HARQ Chase Sub-Burst IE ( ) | | |
|   } else if (Mode== 001) { | | |
|     UL HARQ IR CTC Sub-Burst IE ( ) | | |
|   } else if (Mode== 010) { | | |
|     UL HARQ IR CC Sub-Burst IE ( ) | | |
|   } else if (Mode== 011) { | | |
|     MIMO UL Chase HARQ Sub-Burst IE ( ) | | |
|   } else if (Mode== 100) { | | |
|     MIMO UL IR H-ARQ Sub-Burst IE ( ) | | |
|   } else if (Mode== 101) { | | |
|     MIMO UL IR HARQ for CC Sub-Burst IE ( ) | | |
|   } else if (Mode == 110) { | | |
|     MIMO UL STC HARQ Sub-Burst IE ( ) | | |
|   } | | |
| } | | |
| } | | |
| Padding Padding to byte; shall be set to 0 | variable | — |
| } | | |

The UL HARQ Sub-Burst IE may use any of the modes in table 1. The Chase HARQ mode will be used as an example. If the CDMA_Alloc_IE received by the MS with Duration set to zero was the nth CDMA_Alloc_IE in the UL MAP, the nth UL HARQ Chase Sub-burst IE is located at 111. CID allocated in the nth UL HARQ Chase Sub-burst IE will be saved. Table 2 shows a format of the HARQ Chase UL Sub-burst IE, message. The UL HARQ burst (containing BRH, RNG_REQ or other data) in the UL allocation pointed to by the UL HARQ Chase Sub-Burst IE will be transmitted at 113. If the Reserved Bit in the UL HARQ Chase Sub-Burst IE is set to 1, a Multi-Frame HARQ is indicated at 117.

TABLE 2

| Syntax | Size | Notes |
|---|---|---|
| HARQ Chase UL Sub-Burst IE { | — | — |
|   RCID IE( ) | variable | — |
|   Dedicated UL Control Indicator | 1 bit | — |
|   If(Dedicated UL Control Indicator ==1) { | — | — |
|     Dedicated UL Control IE ( ) | variable | — |
|   } | — | — |
|   UIUC | 4 bits | — |
|   Repetition Coding Indication | 2 bits | 0b00 = No Repetition Coding |
| | | 0b01 = Repetition Coding of 2 used |
| | | 0b10 = Repetition Coding of 4 used |
| | | 0b11 = Repetition Coding of 6 used |
|   Duration | 10 bits | — |
|   ACID | 4 bits | — |
|   AI_SN | 1 bit | — |
|   ACK disable | 1 bit | When "ACK Disable" ==1, the allocated sub-burst does not require an ACK to be transmitted by the BS in the HARQ ACK BITMAP. In this case, no bit position is allocated for the sub-burst in the HARQ ACK BITMAP. For the burst, MS shall not perform HARQ retransmission and ignore ACID, AI_SN and SPID, which shall be set to '0' by BS if they exist. |

TABLE 2-continued

| Syntax | Size | Notes |
| --- | --- | --- |
| Reserved | 1 bit | 0: Not a multi-frame HARQ burst OR Last frame of a multi-frame HARQ burst<br>1: Frame of a multi-frame HARQ burst (except not the last frame) |
| } | — | — |

To determine if the UL transmission was successfully decoded, the MS may wait for the DL HARQ ACK IE (bit position corresponding to the index of the UL HARQ Chase Sub-Burst IE) in the DL MAP at 115. Table 3 shows a format of the HARQ_ACK IE message. If the MS receives an ACK, the temporary CID is discarded and the transmission is complete and the HARQ process ends at 119. If the MS receives a NACK, the MS may wait for a subsequent UL HARQ Chase Sub-Burst IE (in a HARQ UL MAP IE) with the temporary CM at 111. If no HARQ UL MAP IE, with corresponding Chase Sub-Burst IE is received in the UL frame, CDMA code transmission may be restarted at 101. If no CDMA_Alloc_IE is received within a timeout, CDMA code transmission may be restarted at 101.

TABLE 3

| Syntax | Size | Notes |
| --- | --- | --- |
| HARQ_ACK_IE( ) { | — | — |
| Extended-2 DIUC Set to 0x1 | 4 bits | HARQ_ACK IE( ) = 0x8 |
| Length | 8 bits | Length of the IE in bytes |
| RCID_Type | variable | Bitmap size is determined by Length field |
| } | — | — |

HARQ for UL Network Entry Messages (RNG-REQ)

Figure 2:
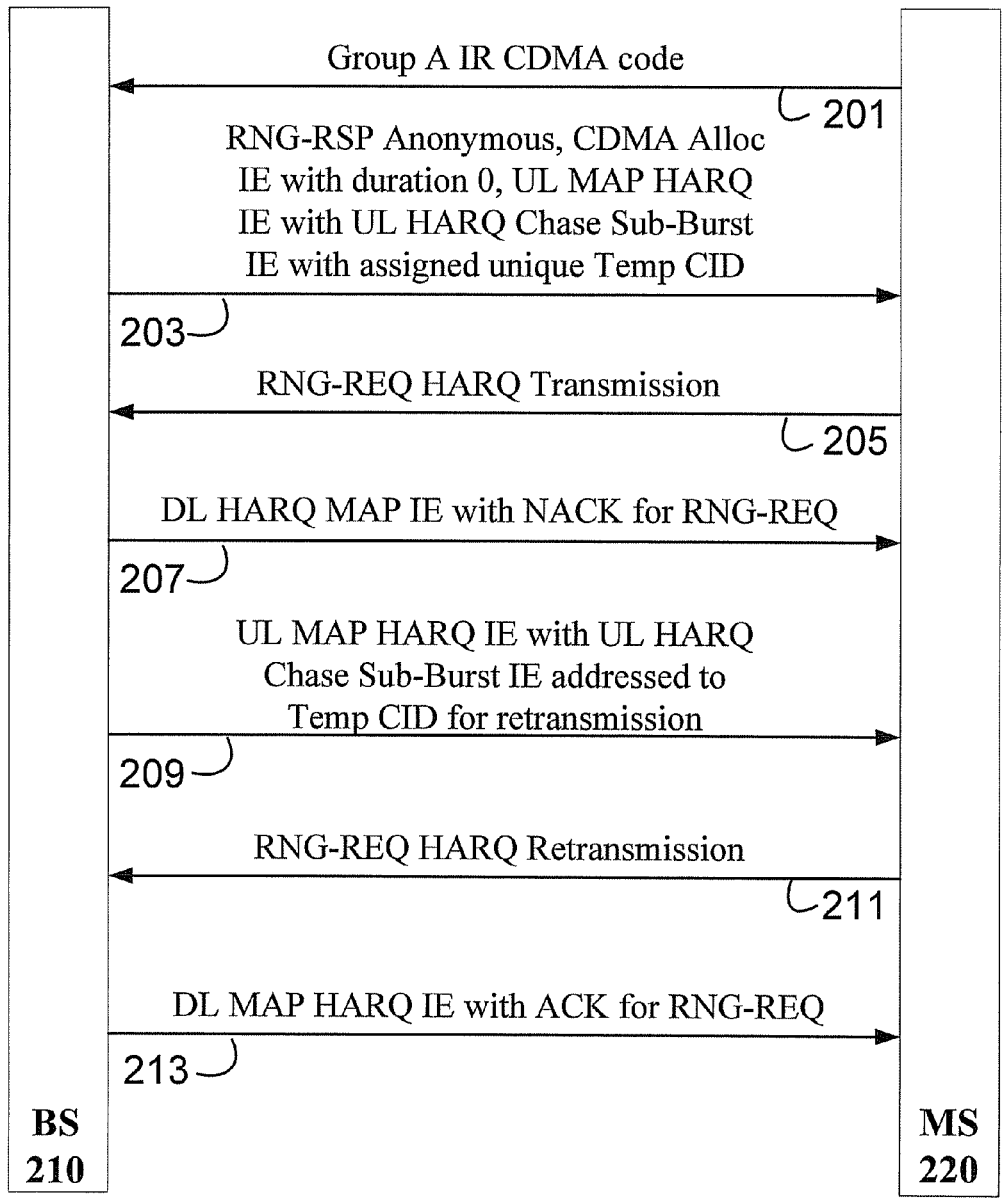
FIG. 2 is a ladder diagram that shows the sequence of message exchanges during WiMAX network entry (for RNG-REQ) that are HARQ enabled.

FIG. 2 is a ladder diagram that shows the sequence of message exchanges during network entry (for RNG-REQ) that are HARQ enabled. A MS, 220, that is capable of using HARQ for Network Entry messages send (at 201) an initial ranging (IR) code from Group A.

When the BS, 210, detects an IR code from Group A, the BS sends (at 203) a CDMA_Alloc_IE, with Duration 0 and a UL HARQ Chase Sub-Burst IE allocating a HARQ transmission opportunity. The BS prepares the CDMA_Alloc_IE, with Duration=0 for each of the CDMA codes to be responded to. In the UL HARQ MAP IE, the BS may add a UL HARQ Chase Sub-Burst IR for every CDMA_Alloc_IE. The CDMA_Alloc_IE; may also include a temporary OD to which allocation is addressed in case of retransmission. The temporary CID is a unique value not already in use. The UL HARQ Chase Sub-Burst IE may have Duration set to a value greater than 0 and less than or equal to Threshold_A. If the BS is to respond with a Multi-Frame HARQ Allocation, the BS may set the reserved bit in UL HARQ Chase Sub-Burst IE to 1. The UL HARQ Chase Sub-Burst IE may be repeated for a number of frames given by Multi_Frame_Burst_Group_A. The BS may HARQ combine transmissions received in the slots indicated by the UL HARQ Chase Sub-Burst IE.

The CDMA_Alloc_IE indicates to the MS that the MS needs to send (at 205) a HARQ-enabled RNG-REQ message. In case of failure of the first RNG-REQ message transmission, the BS sends (at 207) a HARQ ACK IE 14 with NACK bit set corresponding to the transmission. The ACK/NACK is sent in the DL_HARQ_ACK_IE and the bit position corresponds to the index of the UL HARQ Chase Sub-Burst IE in the UL_MAP_HARQ_IE. The BS sends (at 209) a UL HARQ Chase Sub-Burst IE, allocating a HARQ retransmission opportunity for the RNG-REQ. The MS re send (at 211) a HARQ-enabled RNG-REQ message.

The MS discards the temporary CID once it receives a HARQ ACK (sent at 213) for this HARQ burst carrying RNG-REQ. The MS also discards the temporary CID if it times out and needs to restart CDMA ranging.

Multi-Frame HARQ for UL Network Entry Messages (SBC-REQ)

Figure 3:
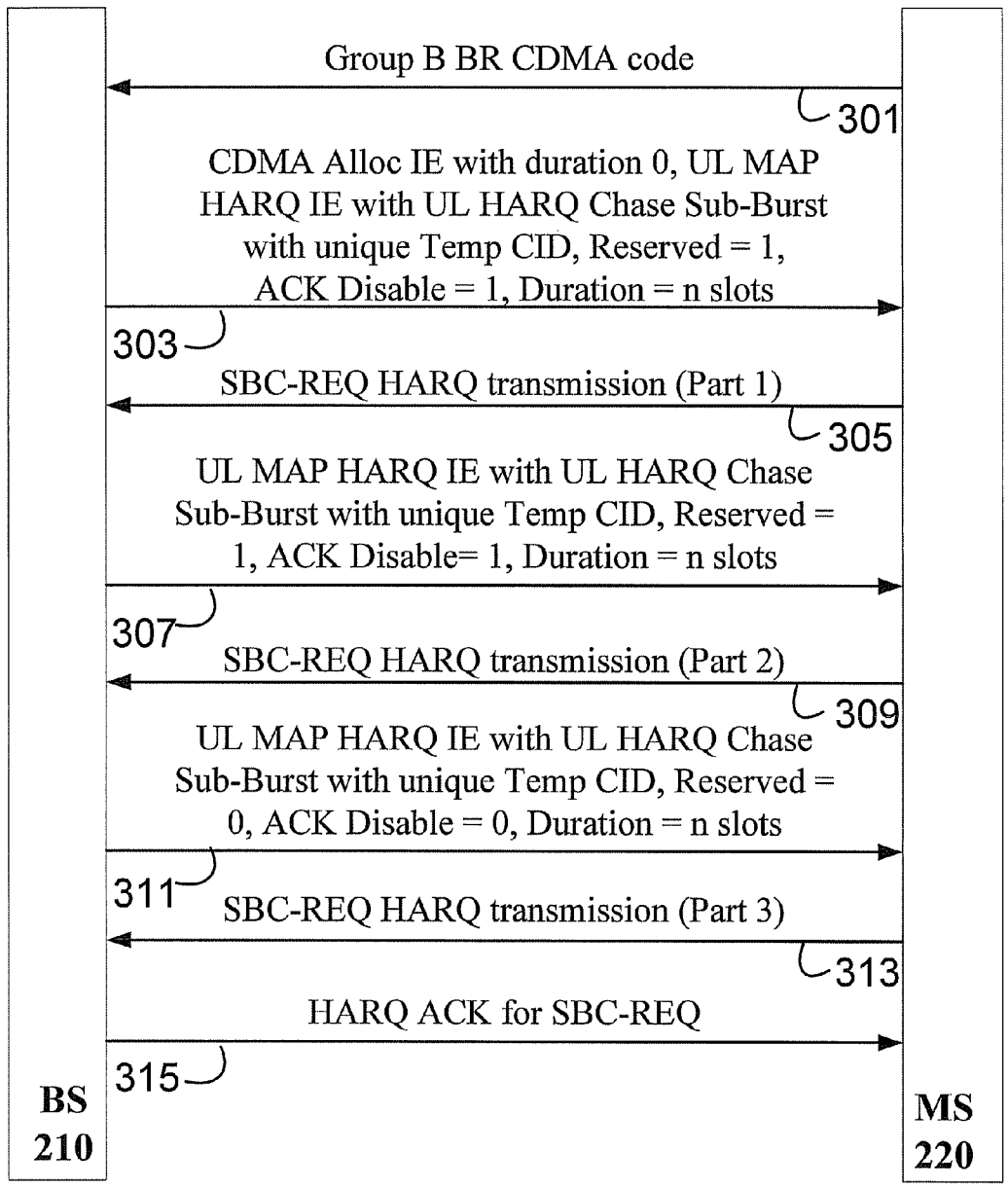
FIG. 3 is a ladder diagram that shows the sequence of message exchanges during WiMAX network entry (for SBC-REQ) that are HARQ enabled.

FIG. 3 is a ladder diagram that shows the sequence of message exchanges during network entry (for SBC-REQ) that are HARQ enabled. Enabling HARQ on the SBC-REQ message may provide 4-6 dB of UL link budget improvement. FIG. 3 may also apply if the MS requests bandwidth for other UL Data (i.e. for non-Network Entry UL Transmission).

After the ranging request/response (RNG-REQ/RNG-RSP) handshake is completed, the MS, 220, must send an SBC_REQ message. A MS that is capable of using HARQ for Network Entry messages may send (at 301) a bandwidth request (BR) code from Group B.

When the BS, 210, detects an IR code from this set, the BS sends (at 303) a CDMA_Allo_IE with Duration 0 and a UL HARQ Chase Sub-Burst IE (in a UL HARQ MAP IE) allocating a HARQ transmission opportunity. The BS prepares the CDMA_Alloc_IE with Duration=0 for each of the CDMA codes to be responded to. In the UL HARQ MAP IE the BS may add a UL HARQ Chase Sub-Burst IE, for every CDMA_Alloc_IE. The CDMA_Alloc_IE may also include a temporary CID to which allocation is addressed in case of retransmission. The temporary CEO is a unique value not already in use. The UL HARQ Chase Sub-Burst IE may have Duration set to a value greater than 0 and less than or equal to Threshold_B. If the BS is to respond with a Multi-Frame HARQ Allocation, the BS may set the reserved bit in UL HARQ Chase Sub-Burst IE to 1. The UL HARQ Chase Sub-Burst IE may be repeated for a number of frames given by Multi_Frame_Burst_Group_B. The BS may HARQ combine transmissions received in the slots indicated by the UL HARQ Chase Sub-Burst IE. The CDMA_Alloc_IE, indicates to the MS that it needs to send a HARQ-enabled SBC-REQ message. The CDMA_Alloc_IE also includes a Temporary CID to which allocation is addressed in case of retransmission.

Within the UL HARQ Chase Sub-Burst IE (in a UL HARQ MAP IE), the BS uses the available Reserved bit to indicate a multi-frame HARQ burst. Multi-frame HARQ bursts may be differentiated from normal HARQ bursts in the several ways. For example, there may be a single CRC16 at the end of a multi-frame HARQ burst. The BS may make HARQ allocations, which are addressed explicitly to the Temporary CID, in Multi_Frame_Burst_Group_B consecutive frames. In each frame that is not the last frame (e.g. sent at 303 and 307) of a multi-frame HARQ burst, the UL HARQ Chase Sub-Burst IE (in a UL HARQ MAP IE) may be formatted with: 1) reserved bit=1; 2) HARQ ACK Disable=1; 3) Duration=Number of slots that will be allocated in each frame; and 4) the modulation and coding scheme MCS (i.e.

Uplink Interval Usage Code, UIUC) will remain fixed for each frame. The size of the multi-frame burst may be obtained as the Duration. The Duration may be computed as (first UL HARQ Chase Sub-Burst IE)×(Multi_Frame_Burst_Group_B slots)×(MCS). The last frame of a multi-frame HARQ burst (e.g. sent at 211) will indicate the format for the UL HARQ Chase Sub-Burst IE (in a UL HARQ MAP IE) with: 1) reserved bit=0; 2) HARQ ACK Disable=0; 3) Duration=Number of slots that will be allocated in each frame; and 4) the modulation and coding scheme MCS (i.e. Uplink Interval Usage Code, UIUC) will remain fixed for each frame.

An SBC-REQ message may be sent as part 1 (at 305), as part 2 (at 309) and as part 3 (at 313) following receipt of each frame of the multi-frame HARQ burst (sent at 303, 307 and 311 respectively). In case of success of the SBC-REQ message transmission, the BS sends (at 315) a HARQ ACK IE with the ACK bit set corresponding to the multi-frame transmission. In case of failure of the SBC-REQ message transmission, the BS sends a HARQ ACK IE with the NACK bit set corresponding to the multi-frame transmission. The ACK/NACK is sent in the DL_HARQ_ACK_IE, and the bit position corresponds to the index of the UL HARQ Chase Sub-Burst IE in the UL_MAP_HARQ_IE. If retransmission is required, the BS then sends another UL HARQ Chase Sub-Burst IE allocating another multi-frame HARQ retransmission opportunity for the SBC-REQ. The MS discards the temporary CID once it receives a HARQ ACK for the SBC-REQ or if it times out and needs to restart CDMA ranging.

Although specific embodiments have been described and illustrated, the embodiments are not to be limited to the specific forms or arrangements of parts so described and illustrated. The embodiments are limited only by the appended claims.

What is claimed:

1. A method for communication in a wireless system comprising:
   receiving, by a communication device from a base station, an indication that a ranging code-space includes at least a first group and a second group, wherein a first maximum allocation in response to an allocation request associated with the first group is smaller than a second maximum allocation in response to an allocation request associated with the second group;
   transmitting by the communication device a first message including a ranging code selected from one of the first group and the second group;
   receiving by the communication device an uplink information element including an allocation information element and a sub-burst information element associated with the ranging code;
   if a duration bit in the allocation information element is greater than zero, transmitting a bandwidth request header according to a legacy protocol; and
   if the duration bit in the allocation information element is set to zero, transmitting a second message using the ranging code and according to a temporary identifier in the sub-burst-information element.

2. The method of claim 1, wherein the indication that the ranging code-space includes at least the first group and the second group is received in an uplink channel descriptor message.

3. The method of claim 1, further comprising: receiving a duration information, an acknowledge disable bit and a reserved bit in the sub-burst information element.

4. The method of claim 1, wherein the sub-burst information element is associated with a chase combining Hybrid Automatic Repeat Request mode.

5. The method of claim 1, wherein the sub-burst information element is associated with an incremental Redundancy Hybrid Automatic Repeat Request mode.

6. The method of claim 1, wherein the sub-burst information element is associated with a Multiple Input Multiple Output mode.

7. The method of claim 1, wherein the second message is a Ranging Request message.

8. The method of claim 1, wherein the second message is a Basic Capability Request message.

9. A Mobile Station (MS) configured to communicate with a Base Station (BS), wherein the MS comprises:
   a processor configured to:
   receive an indication that a ranging code-space includes at least a first group and a second group, wherein a first maximum allocation in response to an allocation request associated with the first group is smaller than a second maximum allocation in response to an allocation request associated with the second group;
   transmit a first message including a ranging code from one of the first group and the second group;
   receive an uplink information element including an allocation information element and a sub-burst information element associated with the ranging code;
   determine whether a duration bit in the allocation information element is set to zero;
   if the duration bit in the allocation information element is greater than zero, transmitting a bandwidth request header according to a legacy protocol; and
   if the duration bit is set to zero, transmit a second message using the ranging code and according to a temporary identifier in the sub-burst information element.

10. The MS of claim 9, wherein the processor is configured to receive the indication that the ranging code-space includes at least the first group and the second group in an uplink channel descriptor message.

11. The MS of claim 9, wherein the processor is further configured to receive a duration information, an acknowledge disable bit and a reserved bit in the sub-burst information element.

12. The MS of claim 9, wherein the processor is further configured to determine whether the sub-burst information element is associated with a Chase Combining Hybrid Automatic Repeat Request mode.

13. The MS of claim 9, wherein the processor is further configured to determine whether the sub-burst information element is associated with an Incremental Redundancy Hybrid Automatic Repeat Request mode.

14. The MS of claim 9, wherein the processor is further configured to determine whether the sub-burst information element is associated with a Multiple Input Multiple Output mode.

15. The MS of claim 9, wherein the second message is a Ranging Request message.

16. The MS of claim 9, wherein the second message is a Basic Capability Request message.

17. A method for communication in a wireless system comprising:
   receiving, by a communication device from a base station, an uplink channel descriptor message including a first group of ranging codes, a second group of ranging codes, and a default group of ranging codes;

transmitting by the communication device a message including a ranging code selected from one of the first group and the second group;

receiving by the communication device an uplink information element including an allocation information element and a sub-burst information element associated with the ranging code;

if a duration bit in the allocation information is set to zero, transmitting one of an uplink media access control management message and an uplink data message using the ranging code according to a sub-burst mode of the sub-burst information element; and if the duration bit in the allocation information element is greater than zero, transmitting a bandwidth request header according to a legacy protocol.

18. A method for communication in a wireless system comprising:

receiving, by a communication device from a base station, an indication that a ranging code-space includes at least a first group and a second group, wherein a first maximum allocation in response to an allocation request associated with the first group is smaller than a second maximum allocation in response to an allocation request associated with the second group;

transmitting by the communication device a first message including a ranging code selected from one of the first group and the second group;

receiving by the communication device an uplink information element including an allocation information element and a sub-burst information element associated with the ranging code; and if a duration bit in the allocation information element is set to zero, transmitting a second message using the ranging code and according to a temporary identifier in the sub-burst information element.

* * * * *